United States Patent [19]

Jang

[11] Patent Number: 4,730,792

[45] Date of Patent: Mar. 15, 1988

[54] A BRAKING DEVICE FOR A VIDEO CASSETTE RECORDER

[75] Inventor: Jae H. Jang, Seoul, Rep. of Korea

[73] Assignee: Gold Star Co., Ltd., Seoul, Rep. of Korea

[21] Appl. No.: 899,084

[22] Filed: Aug. 22, 1986

[30] Foreign Application Priority Data

Aug. 23, 1985 [KR] Rep. of Korea ............... 10784/1985

[51] Int. Cl.$^4$ ..................... B65H 16/10; G11B 15/32; F16D 51/00
[52] U.S. Cl. ................. 242/204; 242/156.2; 188/74; 188/166; 360/96.3
[58] Field of Search ............... 188/74, 166; 360/96.1, 360/96.2, 96.3, 96.4, 132; 242/156, 55, 179, 156.2, 204, 75, 75.4, 75.43, 201–203, 75.5

[56] References Cited

U.S. PATENT DOCUMENTS

| | | | |
|---|---|---|---|
| 3,052,421 | 9/1962 | Fischer | 242/156.2 X |
| 4,310,131 | 1/1982 | Althuber et al. | 242/204 |
| 4,367,856 | 1/1983 | Kondo | 242/204 |

Primary Examiner—David Werner
Attorney, Agent, or Firm—Birch, Stewart, Kolasch & Birch

[57] ABSTRACT

A braking device for a video cassette recorder comprises braking members operatively connected to a supply reel table and a take-up reel table, the braking members pivot about its pivot pins disposed on the center thereof, a movable member including a first trapezoidal recess and a second trapezoidal recess disposed on the rear portion thereof, the first and second recesses being connected to the braking members, respectively, a connecting plate operatively disposed on the movable member, the connecting member including a first trapezoidal recess and a second trapezoidal recess which are disposed on the rear portion thereof, and corresponded to the first and second recesses of the movable member, a connecting portion extended from the front portion thereof and latching portions disposed on the front portion thereof, a ratchet having a triangular protrusion and a latching recess for corresponding to the latching portions of the connecting member, and a cam including a worm gear disposed on the circumferential surface thereof for operatively engaging with a worm, the cam being operatively engaged with a pin mounted to the connecting portion of the connecting plate, the worm secured to an axial rod which connects to a pair of inclined surfaces for abutting against the edge of one end of the ratchet whereby during operation of the reel tables of the video cassette recorder, the reel tables stop quickly by rotating the worm clockwise.

1 Claim, 7 Drawing Figures

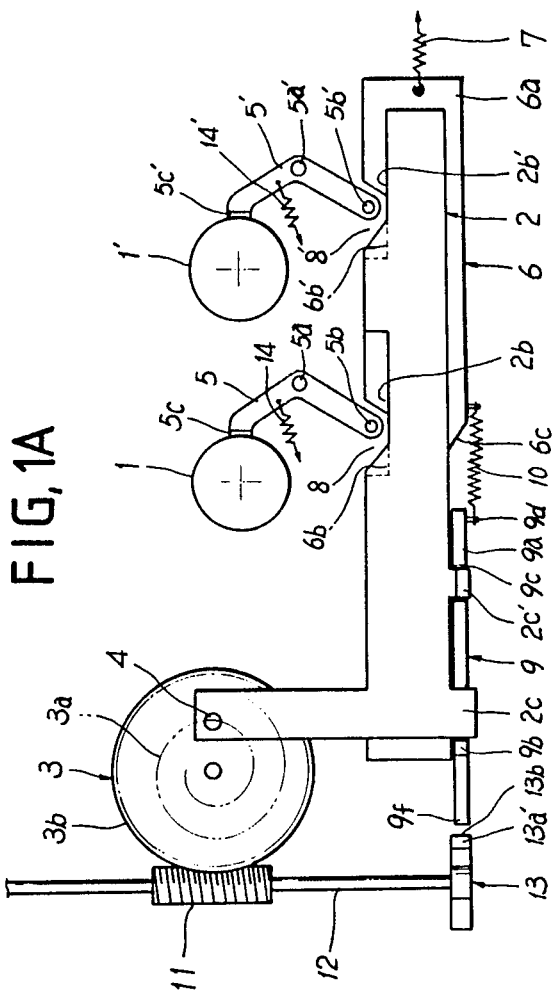

A BRAKING DEVICE FOR A VIDEO CASSETTE RECORDER

BACKGROUND OF THE INVENTION

1. Field of the Invention

The present invention relates to a braking device for a Video Cassette-Tape Recorder, and more particularly to a braking device for the sudden braking of reel tables of a video cassette recorder.

2. Description of Related Art

A conventional Video Cassette-tape Recorder generally includes brake shoes which are brought into functional contact with a set of reel tables so that they can be stopped suddenly. Subsequent to the completion of the braking operation of the tape cassette is charged into a play mode.

In such a conventional video cassette recorder the braking apparatus for sudden braking of a reel table is composed of a cam mounted on a cam shaft at one side of supply reel table, a connecting plate movable longitudinally in front of the supply and take-up reel tables according to the rotation of the cam, and a plurality of gears sliding plates connected operatively to the connecting plate. However, the conventional braking devices have recognized disadvantages in that they are generally complex in structure having many component elements as a result the activation of the brake is not effective and produces a terrible noise. The present invention has been developed for the purpose of removing these defects.

SUMMARY OF THE INVENTION

Accordingly, it is an object of the present invention to provide an improved braking device which is simple in construction, silent in operation and operates in a very efficient manner.

The present invention provides a braking device which comprises two actuation levers having respective first and second end portions, a movable member formed with a pair of $\bigsqcup$-shaped recesses on the rear surface thereof and a cut-out portion on the front surface thereof, a connecting plate including a $\bigsqcup$-shaped recess, a cut-out portion, a connecting lever portion and two latching portions, a ratchet having a triangular protrusion, a latching recess and a triangular end portion, a coil spring retained between a pin fixed to one end of the ratchet and a pin secured to the front surface of the movable member, and a cam provided with a worm gear on the circumferential surface thereof to mesh with a worm mounted on the axial rod.

BRIEF DESCRIPTION OF THE DRAWINGS

This invention will be apparent from the description made in connection with the accompanying drawings:

FIG. 1A is a top plan view of the braking device of present invention;

DETAILED DESCRIPTION OF THE INVENTION

Figure 1B:
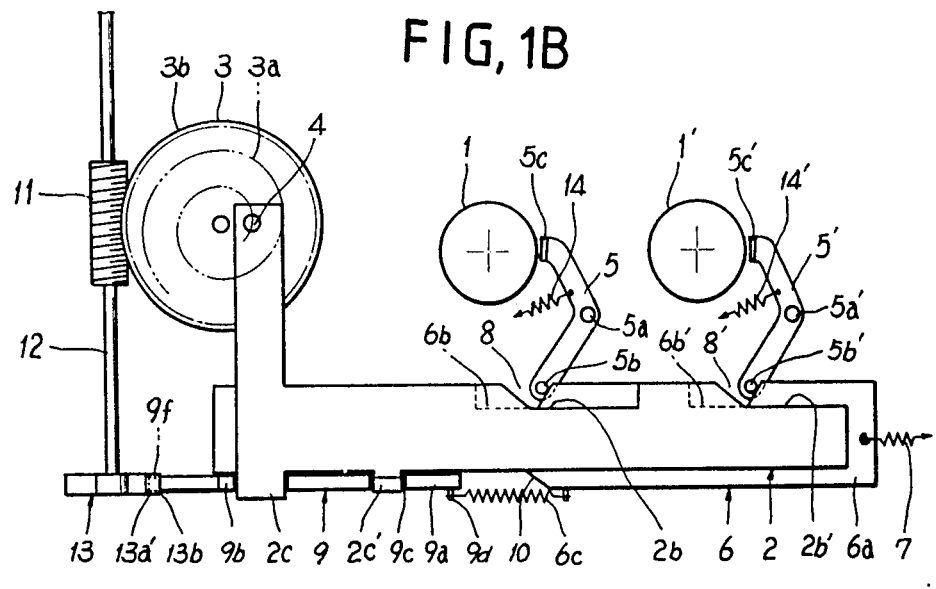
FIG. 1B is a top plan view of the braking device of the present invention in the release mode.
Figure 1C:
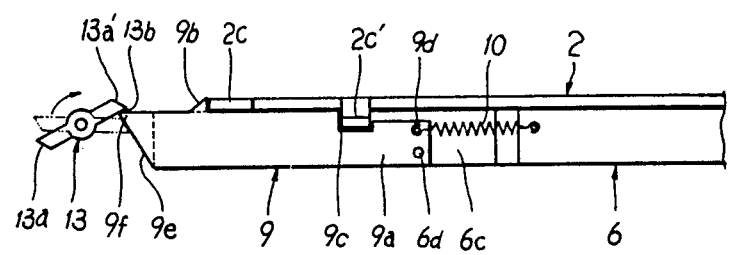
FIG. 1C is a partial side elevational view of the braking device showing a ratchet engaged with the connecting plate.
Figure 1D:
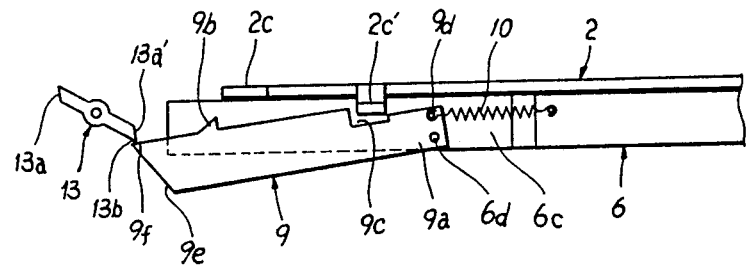
FIG. 1D is a partial side elevational view showing a ratchet disengaged from the connecting plate.
Figure 1E:
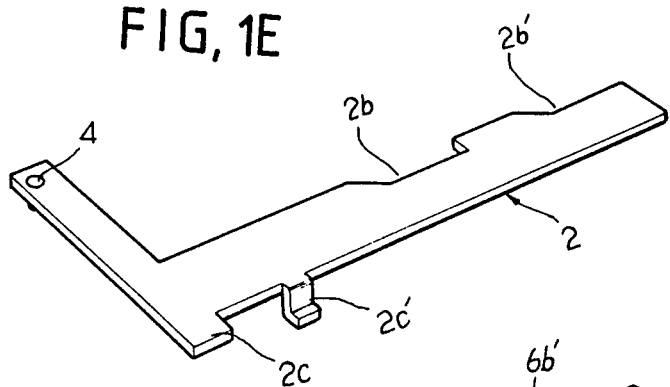
FIG. 1E is a perspective view of the connecting plate of the braking device of the present invention.
Figure 1F:
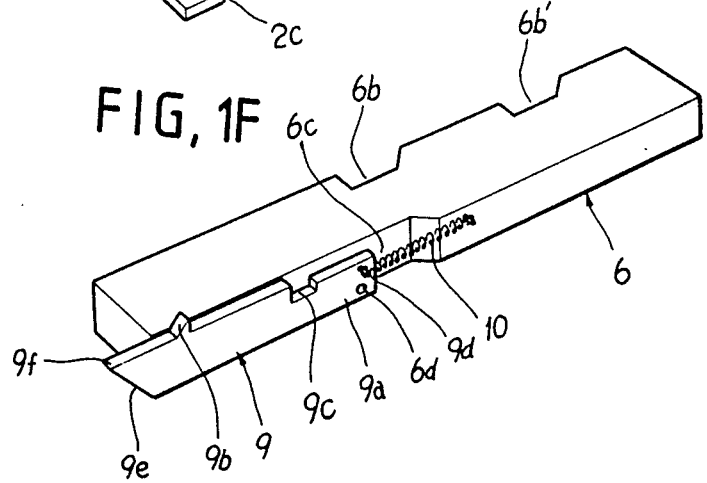
FIG. 1F is a perspective view of the braking device showing a movable member pivotally engaged with the ratchet.
Figure 2:
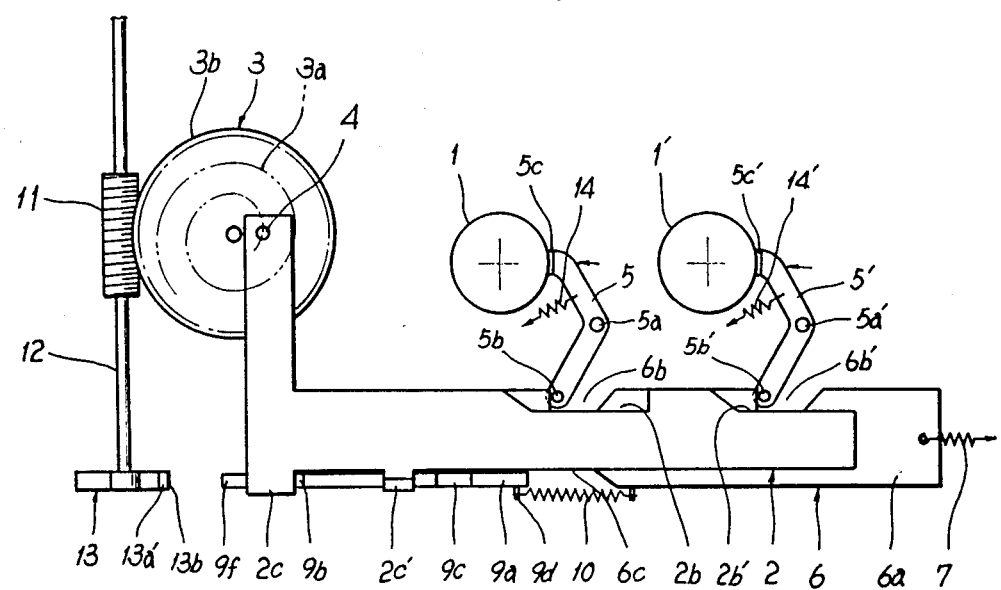

Referring to FIGS. 1 and 2, a connecting plate 2 is installed movably in a transverse direction in front of reel tables 1 and 1'. Mounted beside the supply reel table 1 is a cam 3 on which a spiral groove 3a is formed to receive a connecting pin 4 protruded downward from one end of a connecting lever portion 2a of a connecting plate 2 which is inserted into the groove 3a of the cam 3 so that the connecting plate 2 is actuated in accordance with the rotation of the cam 3. Subsequently, each of the actuation levers 5 and 5', fixed pivotally on a base plate (not shown) by means of respective pivot pins 5a and 5a', are activated for stopping respective reels 1 and 1'. A movable member 6, slightly longer than the length of the connecting plate 2, is mounted on the under surface of the connecting plate 2 movable in left and right directions. Secured to one end 6a of the movable member is one end of a coil spring 7, which is fixed to the base plate (not shown). The $\bigsqcup$-shaped recesses 6b and 6b' of a trapezoid-type are formed at a predetermined interval on the rear surface of the movable member 6. On the rear surface of the connecting plate 2 a $\bigsqcup$-shaped recess 2b and a cut-out portion 2b' are formed etc. at a predetermined interval to provide a $\bigsqcup$-shaped recesses 8 and 8' with the aid of the $\bigsqcup$-shaped recesses 6b and 6b' of the movable member 6.

A pair of actuation levers 5 and 5' are mounted on the base plate rockably about pivot pins 5a and 5a', the first end portions of the actuation levers being brought into contact with the peripheral surfaces of the reel tables 1 and 1' during braking operation, the second end portions being received in the $\bigsqcup$-shaped recesses 8 and 8'.

Formed on the front surface of the movable member 6 is a cut-out portion 6c to which a ratchet 9 is attached to pivot about an axial pin 6d secured to the cut-out portion 6c. On the upper surface of the ratchet 9, a triangular protrusion 9b and a latching groove 9c are formed at a predetermined interval, two latching portions 2c and 2c' formed on the front edge of the connecting plate 2 being latched on the triangular protrusion 9b and the latching groove 9c. A coil spring 10 is retained between a pin 9d fixed to one end of the ratchet 9 and a pin secured to the front surface of the movable member 6.

On the circumferential surface of the cam 3, a worm gear 3b is formed to mesh with the worm 11 fixed to the axial rod 12. A pushing member 13 is coupled to one end of the axial rod 12, the pushing member having a pair of inclined surfaces 13a and 13a' on the opposite ends thereof, one end of which abuts against the triangular end portion 9f of the ratchet 9.

FIG. 1A shows an operating status of the present invention in a STOP mode wherein the latching portions 2c and 2c' of the connecting plate 2 are latched on the triangular protrusion 9b and latching recess 9c of the ratchet 9, respectively, and the second end portions of the actuation levers 5 and 5' are received in the $\bigsqcup$-shaped recesses 8 and 8' defined by the recesses 6b and 6b' of the movable member 6 and the recesses 2b and 2b' of the connecting plate 2.

The worm 11 is then rotated counterclockwise by means of a separate motor whereby the cam is rotated counterclockwise. Accordingly, the connecting plate 2 is shifted to the left and the movable member 6 is moved to the left, causing the coil spring 7 to be stretched, whereby the protrusions 5b and 5b' of the actuation levers 5 and 5' are brought into contact with the inclined surfaces of the recesses 6b and 6b' of the movable member 6. With the continuous movement of the movable member 6 to the left side, the actuation levers 5 and 5' are rotated clockwise about respective pivot pins 5a and 5a' so that the frictional surfaces 5c and 5c' thereof are disengaged from the supply and take-up reel tables 1 and 1', subsequent to which FAST FORWARD or REWIND mode is started.

In the event of stopping the FAST FORWARD mode, the pushing member 13 is rotated clockwise in response to the reverse rotation of the worm 11 as shown in FIG. 1c and one end 13b of the pushing member presses the triangular end portion 9f of the ratchet 9, whereby the ratchet 9 is rotated counterclockwise about the pin 6d while surpressing the urging force of the coil spring 10. Since the latching portions 2c and 2c' of the connecting plate 2 are unlatched from the triangular protrusion 9b and latching recess 9c, the movable member 6 is retracted to the right by the restoring force of the coil spring 7 and the second end portions of the actuation levers 5 and 5' are brought into contact with the upright portions of the recesses 6b and 6b' in order to pivot the actuation levers 5 and 5' counterclockwise and to urge the frictional surfaces 5c and 5c' of the actuation levers 5 and 5' toward the supply and take-up reel tables 1 and 1', thereby causing the reel tables to be braked quickly.

In the event of converting the braking state into a PLAY mode, the ratchet 9 is rotated clockwise by the restoring force of the coil spring and set to the position as shown in FIG. 2, wherein the ratchet 9 is in the state of being moved to the right by a predetermined length together with the movable member 6, whereby the latching portions 2c and 2c' of the connecting plate 2 are disengaged from the triangular protrusion 9b and the latching recess 9c.

When the connecting plate 2 is moved to the right from the position as shown in FIG. 2 in response to the rotation of the worm 11 and the cam 3, the latching portion 2c of the connecting plate 2 is shifted along the inclined surface of the triangular protrustion 9b, whereby respective latching portions 2c and 2c' are reengaged with the triangular protrusion 9b and latching recess 9c to be able to repeat the operations as set forth hereinabove.

The inclined surfaces 9e, and 13a and 13' of the ratchet and pushing member 13 are formed for the purpose of reducing the frictional resistance between the pushing member 13 and the ratchet 9 when the connecting plate 2 is shifted to the position of the FAST FORWARD mode.

The present invention has been described for the preferred embodiment, however, it will be understood by those in the art to which the invention pertains that the variations and modifications may be restored without departing from the spirit and scope of the invention as claimed in the subjoined claim.

What is claimed is:

1. A braking device for a video cassette recorder which comprises:

braking members operatively connected to a supply reel table and a take-up reel table, each of said braking members pivot about a pivot pin disposed on the center thereof, a movable member including a first trapezoidal recess and a second trapezoidal recess disposed on a rear portion thereof, said first and second recesses being connected to said braking members, respectively, a connecting plate operatively disposed on said movable member, said connecting member including a first trapezoidal recess and a cut out portion which are disposed on the rear portion thereof and corresponded to said first and second recesses of the movable member respectively, a connecting portion extended from the rear portion thereof, and latching portions disposed on the front portion thereof, a ratchet having a triangular protrusion and a latching recess for corresponding to said latching portions of the connecting member, and a cam including a worm gear disposed on the circumferential surface thereof for operatively engaging with a worm, said cam being operative engaged with a pin mounted to the connecting portion of the connecting plate, said worm secured to an axial rod which connects to a pair of inclined surfaces for abutting against the edge of one end of said ratchet whereby during operation of the reel tables of the video cassette recorder, the reel tables stop quickly by rotating the worm clockwise.

* * * * *